(12) United States Patent
Pedigo

(10) Patent No.: US 11,192,245 B2
(45) Date of Patent: Dec. 7, 2021

(54) INDEPENDENT END-EFFECTOR CONTROL AND OPERATION

(71) Applicant: The Boeing Company, Chicago, IL (US)

(72) Inventor: Samuel F Pedigo, Lake Forest Park, WA (US)

(73) Assignee: The Boeing Company, Chicago, IL (US)

(*) Notice: Subject to any disclaimer, the term of this patent is extended or adjusted under 35 U.S.C. 154(b) by 322 days.

(21) Appl. No.: 16/229,402

(22) Filed: Dec. 21, 2018

(65) Prior Publication Data

US 2020/0198134 A1 Jun. 25, 2020

(51) Int. Cl.
*B25J 9/16* (2006.01)
*B25J 15/00* (2006.01)

(52) U.S. Cl.
CPC ......... *B25J 9/1664* (2013.01); *B25J 15/0019* (2013.01)

(58) Field of Classification Search
CPC .......................... B25J 9/1664; B26J 15/0019
See application file for complete search history.

(56) References Cited

U.S. PATENT DOCUMENTS

| | | | | |
|---|---|---|---|---|
| 7,170,026 | B2* | 1/2007 | Nakagami | B23K 9/20 219/98 |
| 7,991,509 | B2* | 8/2011 | Lipow | A61B 34/77 700/264 |
| 9,523,328 | B2* | 12/2016 | Marrocco | F01L 3/10 |
| 9,901,411 | B2* | 2/2018 | Gombert | A61B 34/37 |
| 9,962,834 | B2* | 5/2018 | Stone | B64F 5/10 |
| 10,046,400 | B2* | 8/2018 | Rola | G05B 19/402 |
| 10,071,480 | B2* | 9/2018 | Nishi | B25J 9/1666 |
| 10,399,199 | B2* | 9/2019 | Carberry | B23Q 17/2466 |
| 2010/0241260 | A1* | 9/2010 | Kilibarda | G05B 19/4186 700/95 |
| 2015/0314890 | A1 | 11/2015 | DesJardien et al. | |
| 2016/0334777 | A1* | 11/2016 | Sato | G05B 19/4065 |
| 2017/0095927 | A1 | 4/2017 | Fadlovich et al. | |
| 2017/0351239 | A1 | 12/2017 | Wilder | |

(Continued)

FOREIGN PATENT DOCUMENTS

WO 2017059839 A1 4/2017

OTHER PUBLICATIONS

European Search Report; Application EP19218638; dated Feb. 20, 2020.

(Continued)

*Primary Examiner* — Khoi H Tran
*Assistant Examiner* — Rodney P King
(74) *Attorney, Agent, or Firm* — Duft & Bornsen, PC

(57) ABSTRACT

Systems and methods are provided for controlling robots and their end effectors. One embodiment is a method for controlling a robot. The method includes: maneuvering a robot via a robot controller that is dedicated to operating the robot, thereby altering a position of an end effector mounted to the robot, communicating from the robot controller to an end effector controller that is disposed at the end effector and is dedicated to operating the end effector, determining a position of the end effector via the end effector controller, and operating the end effector via the end effector controller based on the position of the end effector.

20 Claims, 7 Drawing Sheets

(56) References Cited

U.S. PATENT DOCUMENTS

2018/0257221 A1    9/2018 Toothaker et al.

OTHER PUBLICATIONS

Robot end effector; Wikipedia; Oct. 23, 2018.
U.S. Appl. No. 16/230,187.
U.S. Appl. No. 16/230,280.
U.S. Appl. No. 16/230,370.
U.S. Appl. No. 16/230,441.
U.S. Appl. No. 16/230,552.
Ryan Mir; 777X Control Surface Assembly Using Advanced Robotic Automation; SAE Technical Paper 2017-01-2092; Published Sep. 19, 2017.
Tyler Everhart; Neighboring Mobile Robot Cell with Drilling and Fastening; SAE Technical Paper 2017-01-2094; Published Sep. 19, 2017.
European Search Report; Application EP19218638; dated Jul. 24, 2020.

* cited by examiner

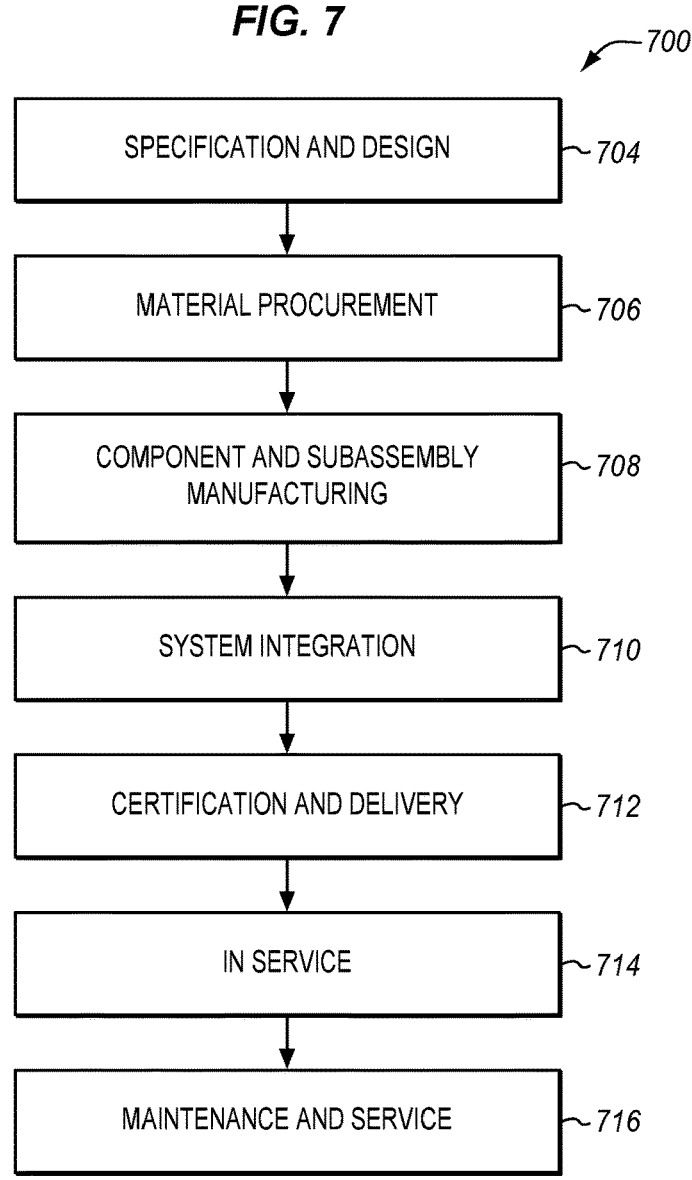
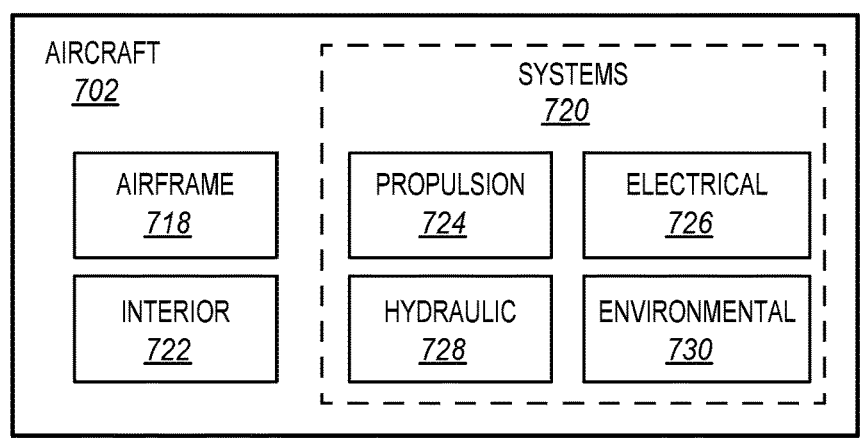

INDEPENDENT END-EFFECTOR CONTROL AND OPERATION

FIELD

The disclosure relates to the field of fabrication, and in particular, to fabrication robots.

BACKGROUND

A robot may perform a variety of tasks upon parts in a fabrication environment. These tasks may include operating an end effector to perform drilling, fastener installation, or hole inspection upon the part. In order to perform an assigned task, a controller at the robot directs components at the robot to move the end effector to a desired location. After the end effector has been positioned, the controller controls the end effector to perform the task upon the part. For example, the controller may direct a tool at the end effector to extend outward and drill a hole into the part.

A single end effector may be substantially complex to control. For example, an end effector for an Automated Fiber Placement (AFP) machine may independently control the asynchronous stopping, starting, and dispensing of twenty tows of carbon fiber at once. Furthermore, it is not atypical for a robot to have multiple interchangeable end effectors that are utilized throughout the fabrication process. Each end effector may have its own control logic stored internally at the controller of the robot. This means that one controller for a robot may include command libraries for many end effectors. Thus, controllers for robots have become more expensive to purchase and maintain as their functionality has been increased.

Therefore, it would be desirable to have a method and apparatus that take into account at least some of the issues discussed above, as well as other possible issues.

SUMMARY

Embodiments described herein provide end effectors having independent controllers. The controllers receive positional updates from controllers at the robots to which they are mounted. Based on this input, the controllers at the end effectors operate the end effectors. This arrangement beneficially reduces the complexity of control systems needed by a robot, and this arrangement also reduces the difficulty of ensuring that code for operating the robot does not become difficult to maintain. An additional technical benefit is that there is no need for the end effector to be attached to the robot in order to operate. Hence, the end effectors described herein may be operated for maintenance or repair while the robot is used for other purposes. This increases an amount of uptime during which the robot may be used for fabrication.

One embodiment is a method for controlling a robot. The method includes: maneuvering a robot via a robot controller that is dedicated to operating the robot, thereby altering a position of an end effector mounted to the robot, communicating from the robot controller to an end effector controller that is disposed at the end effector and is dedicated to operating the end effector, determining a position of the end effector via the end effector controller, and operating the end effector via the end effector controller based on the position of the end effector.

A further embodiment is a non-transitory computer readable medium embodying programmed instructions which, when executed by a processor, are operable for performing a method for controlling an end effector of a robot. The method includes maneuvering a robot via a robot controller that is dedicated to operating the robot, thereby altering a position of an end effector mounted to the robot, communicating from the robot controller to an end effector controller that is disposed at the end effector and is dedicated to operating the end effector, determining a position of the end effector via the end effector controller, and operating the end effector via the end effector controller based on the position of the end effector.

Yet another embodiment is a system for controlling work via a robot. The system includes a robot comprising a robot controller that is dedicated to operating the robot, and an end effector configured for attachment to the robot. The end effector includes an interface that is configured to receive information from the robot indicating locations of the robot, a tool that is configured to perform work on a part, and an end effector controller that is dedicated to operating the end effector, and is configured to direct operations of the tool based on communications with the robot controller.

Still another embodiment is an apparatus for controlling work via a robot. The apparatus includes a robot comprising a drive unit which translates the robot to adjust a position of the robot, a robot controller that is dedicated to operating the robot and is communicatively coupled with the robot, an end effector coupled to the robot, the end effector comprising a tool that is configured to perform work on a part, and an end effector controller that is dedicated to operating the end effector, is communicatively coupled with the end effector, and is configured to direct operations of the tool based on communications with the robot controller.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 7 is a flow diagram of aircraft production and service methodology in an illustrative embodiment.

FIG. 8 is a block diagram of an aircraft in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
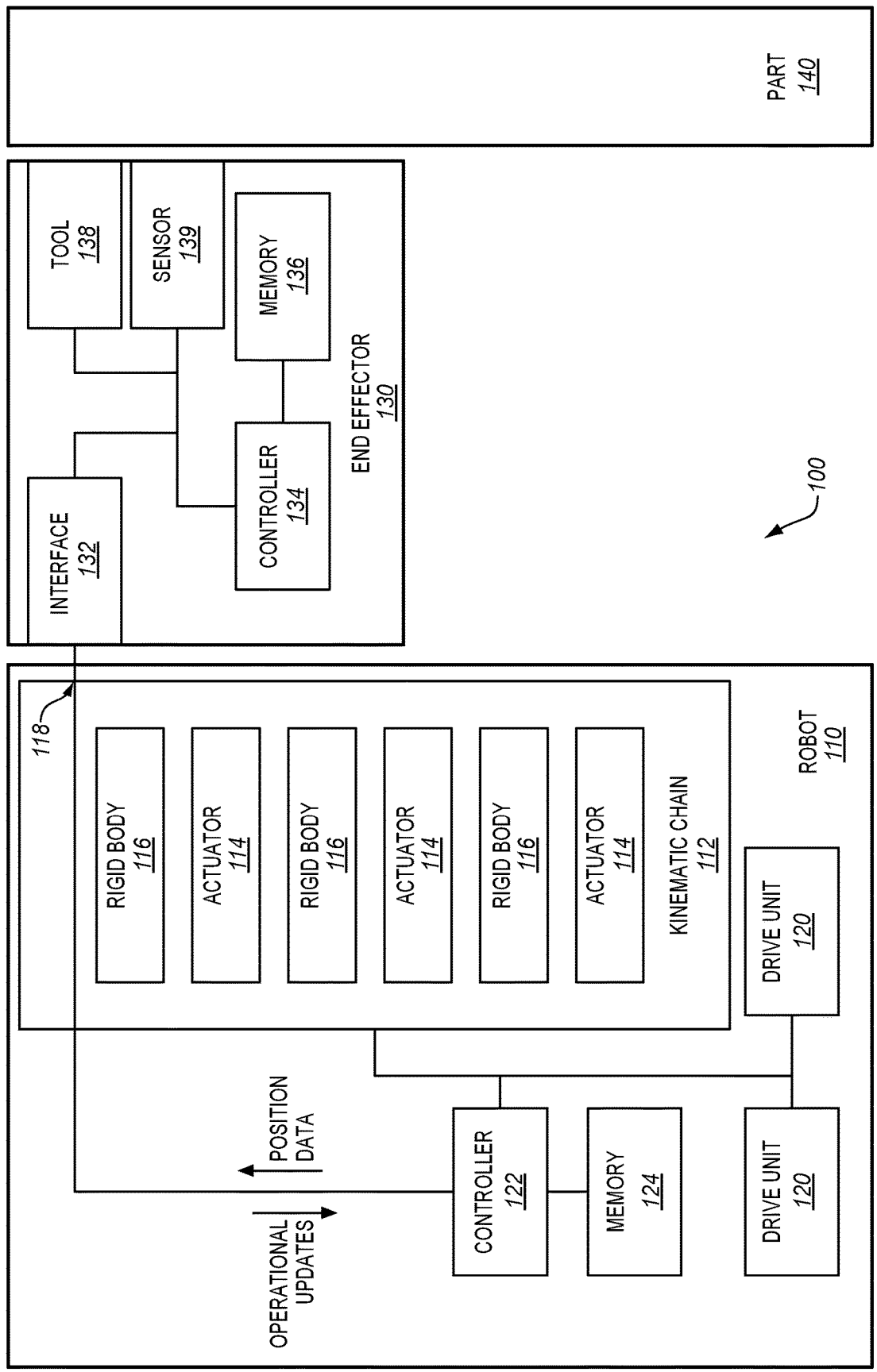
FIG. 1 is a block diagram of a fabrication system which includes a robot that utilizes an end effector to perform work on a part in an illustrative embodiment.

FIG. 1 is a block diagram of a fabrication system 100 which includes a robot 110 that utilizes an end effector 130 to perform work on a part 140 in an illustrative embodiment. Fabrication system 100 comprises any system, component, or device which utilizes a robot to perform work on a part. For example, fabrication system 100 may operate one or more robots in a cell in order to perform drilling, fastening, painting, or other operations upon part 140.

In this embodiment, robot 110 comprises a robot arm that includes a kinematic chain 112 of actuators 114 and rigid bodies 116. In some embodiments, the actuators 114 comprise linear actuators that extend the rigid bodies 116 or rotary actuators that adjust an angle of the rigid bodies 116. The rigid bodies 116 comprise any suitable structural components capable of supporting an end effector and being repositioned by actuators 114. In this embodiment, robot 110 also includes one or more drive units 120 (e.g., tracks, wheels, etc.) which translate/transport/drive the robot 110 to desired locations. The operations of drive units 120 are managed by controller 122 in order to transport the robot 110 to desired locations for performing operations at part 140 (e.g., in order to move the robot 110 to positions indicated by controller 134.

The operations of actuators 114 within kinematic chain 112 are directed by controller 122, which may operate in accordance with a Numerical Control (NC) program stored in memory 124. Based on input from kinematic chain 112, controller 122 determines a current position of robot 110. The current position of robot 110 may indicate where a most-distal portion 118 of kinematic chain 112 is disposed, may indicate where an end effector 130 attached to robot 110 is located, etc. The current position of robot 110 is provided to interface 132 (e.g., an ethernet interface, wireless interface, Universal Serial Bus (USB) interface, etc.) of end effector 130, and is processed by controller 134. As used herein, a "position" of robot is defined by a three dimensional (3D) coordinate indicating where a distal portion of the robot is located in a coordinate system of either the robot 110 or the fabrication system 100. The position may be altered by repositioning components of kinematic chain 112, operating drive units 120 to physically drive/transport the robot 110 to a new location, etc. A position may further include rotational data indicating an orientation along each of three spatial axes. Based on instructions stored in memory 136, controller 134 may direct the operations of a tool 138 (e.g., a drill, punch, rivet gun, spray gun, etc.) in order to perform work on part 140. Controller 134 may also utilize input from a sensor 139 (e.g., an optical sensor, camera, laser, ultrasonic sensor, lidar, radar, etc.) in order to determine the location of tool 138, to quantify progress of tool 138, or otherwise characterize ongoing operations at end effector 130.

In short, FIG. 1 illustrates that controller 122 is dedicated to controlling the operations of robot 110 (e.g., controlling actuators to reposition components of kinematic chain 112, directing the operations of drive units 120, etc.), while controller 134 is dedicated to controlling the operations of end effector 130 (e.g., extending a tool mounted to end effector 130, operating a sensor at end effector 130, etc.). Controller 122 and controller 134 are each capable of independently receiving, interpreting, processing, and reacting to digital input. Controller 122 and controller 134 may even store complementary NC programs which coordinate operations between robot 110 and end effector 130. Controller 122 and controller 134 may each be implemented, for example, as custom circuitry, as a hardware processor executing programmed instructions, or some combination thereof.

As illustrated herein, controller 122 and controller 134 may act as independent entities, wherein controller 122 is responsible for moving robot 110 to desired positions, while controller 134 is responsible for making fine adjustments to the position of end effector 130 via internal components at end effector 130, and performing operations via end effector 130. However, in many embodiments the controller 134 includes a master NC program directing the overall process of performing work. In such embodiments, controller 134 operates as a "master" controller, while controller 122 operates as a "slave" controller. That is, controller 134 subordinates the controller 122, such that controller 122 performs actions at the direction of controller 134. For example, controller 134 may include an NC program which describes locations at which work will be performed. Controller 134 may therefore instruct controller 122 to move robot 110 to those locations. In response to determining that a location has been reached, controller 134 may then direct end effector 130 to perform desired operations, and then instruct controller 122 to move robot 110 to a new location. In this manner, controller 134 supervises the entire process by which end effector 130 is moved and operated.

In some embodiments, controller 122 is housed within or mounted to robot 110, but in further embodiments the controller 122 is remotely disposed from robot 110. Furthermore, in some embodiments the controller 134 is housed within or mounted to end effector 130, while in further embodiments the controller 134 may be remotely located and communicate with end effector 130 via wired or wireless communication means. This means that controller 122 does not need to include instructions for operating each type of end effector which could possibly be mounted to robot 110. Instead, controller 122 includes code that is focused upon operating the kinematic chain 112 and reporting out position data. This increases the speed of operation of robot 110. In addition to enabling the controller 122 to remain focused upon robot operations, controller 134 provides a technical benefit by enabling the end effector 130 to be operated while it is separated/dismounted from robot 110. This means that the end effector 130 may be diagnosed, repaired, or put into maintenance while separated from robot 110, which frees up robot 110 for continuing fabrication operations with another end effector. This reduces downtime at robot 110.

Illustrative details of the operation of a fabrication system will be discussed with regard to the method of FIG. 2 and the fabrication environment depicted in FIG. 3. Assume, for this embodiment, that a part 360 shown in FIG. 3 has been placed in a cell that is occupied by robot 350. The part 360 is mounted to base 362, and will receive work at location 364A. Robot 350 includes a kinematic chain 356 comprising actuator 312, actuator 314, and actuator 316, which adjust the position and orientation of rigid body 320 and rigid body 330. In some embodiments, many of locations 364A, 364B, 364C, etc. are out of reach from robot 350, and hence robot 350 includes one or more drive units 354 (e.g., tracks, wheels, etc.) that enable the entirety of robot 350 to be translated/driven to new positions relative to part 360, as shown in FIG. 3.

Figure 2:
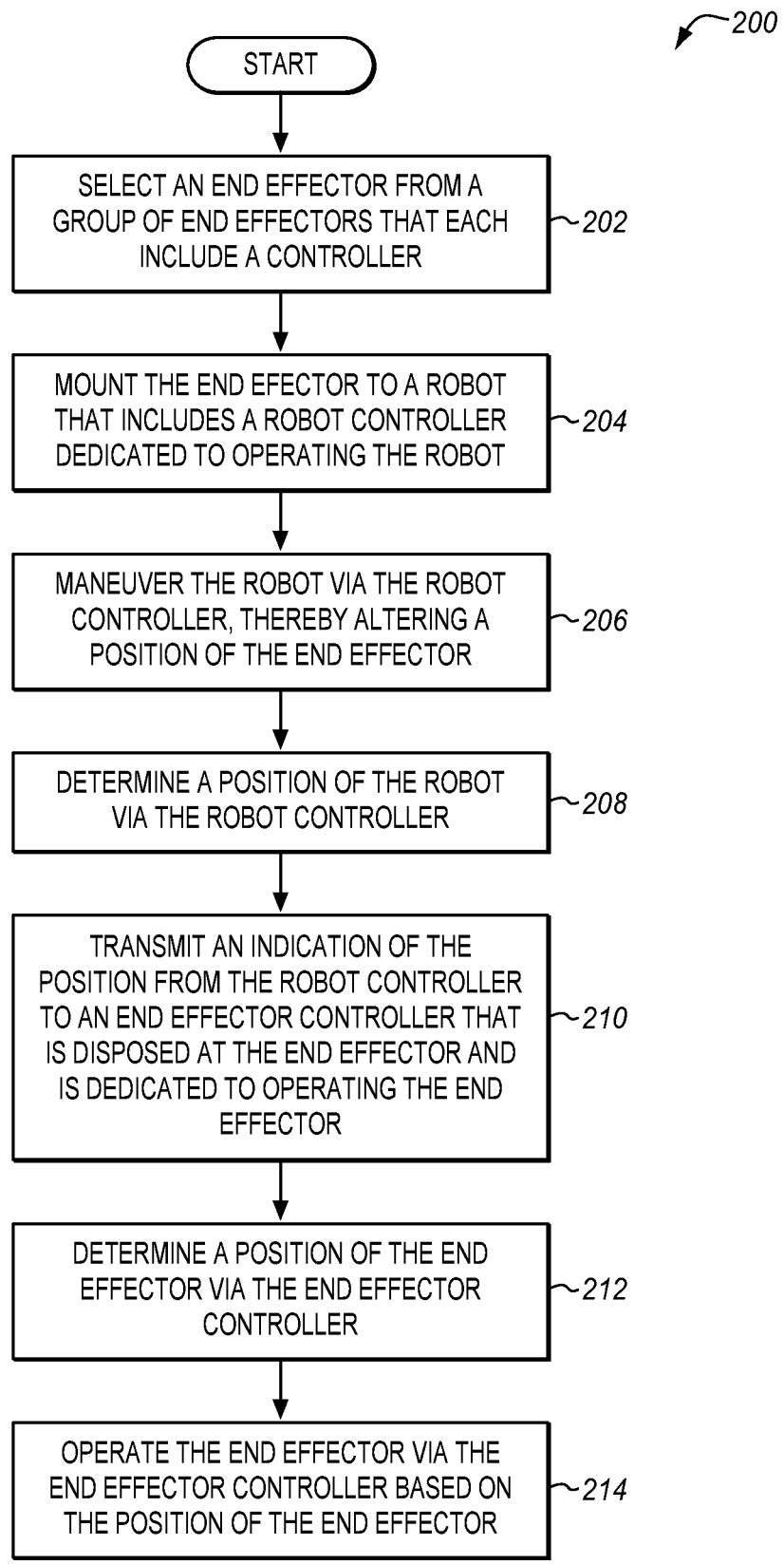
FIG. 2 is a flowchart illustrating a method for operating a robot in an illustrative embodiment.
Figure 3:
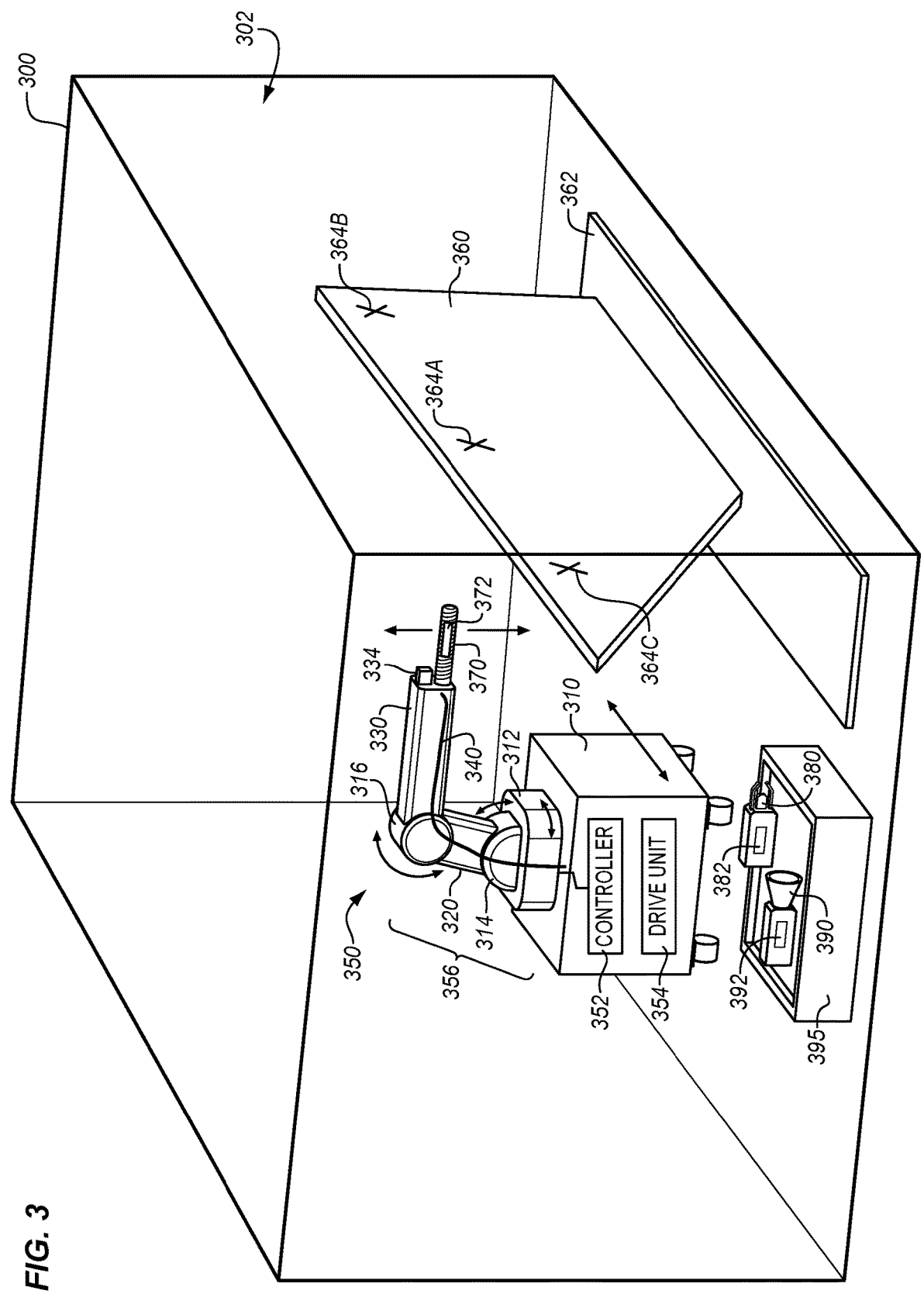
FIG. 3 illustrates a robot performing work on a part via an end effector in an illustrative embodiment.

FIG. 2 is a flowchart illustrating a method 200 for operating a robot 350 in an illustrative embodiment. The steps of method 200 are described with reference to fabrication environment 300 of FIG. 3, but those skilled in the art will appreciate that method 200 may be performed in other systems. The steps of the flowcharts described herein are not all inclusive and may include other steps not shown. The steps described herein may also be performed in an alternative order.

In step 202, an end effector is selected from a group of end effectors that each include a dedicated controller. The controller and/or instructions directing the controller may vary depending upon the type of components (e.g., tools, sensors, etc.) that are disposed at the end effector and/or the operations to be performed by the end effector (e.g., inspection, drilling, etc.). For example, as shown in FIG. 3, an end effector 370 having a dedicated controller 372 may be selected from a group consisting of end effector 370, end effector 380 (having a dedicated controller 382), and end effector 390 (having a dedicated controller 392). The end effector 370 may be selected by a controller 352 for a robot 350 based on the type of work to be performed on the part 360, or based on the number and type of end effectors 130 that are presently available. An end effector may alternatively be chosen by a technician, a predefined schedule, or other criteria. In FIG. 3, end effectors that are not in use by the robot 350 are maintained in storage 395, which may include an electrical power source, access to pneumatic or hydraulic systems, and/or ports that provide access to a network. This enables end effectors that are not in use at the robot 350 to be operated, diagnosed, repaired, and/or maintained as desired while kept at storage 395.

In step 204, the end effector 370 that was selected in step 202 is mounted to robot 350. Robot 350 includes controller 352, which is dedicated to controlling the robot 350 (i.e., without including instructions for operating end effector 370). In step 206, the robot 350 is maneuvered via controller 352 into a desired position, such as where work will be performed upon the part 360. This alters a position of end effector 370. For example, robot 350 may be maneuvered based on instructions in an NC program and input from sensor 334 in order to place end effector 370 at location 364A on part 360. In further embodiments, a controller 372 at the end effector 370 provides positional feedback to the robot 350 based on one or more sensors at the end effector 370. For example, the feedback may enable the robot 350 to adjust the position of end effector 370 after robot 350 has completed its motions in accordance with an NC program. In short, feedback-based control of a position of the end effector 370, based on input from a sensor at end effector 370, enables fine-tuning of the position of end effector 370 relative to part 360. This ensures that any tooling at the end effector 370 is positioned as accurately and precisely as desired.

Controller 352 determines the position of robot 350 in step 208. This may be determined based on input from sensors at robot 350, based on the instruction in an NC program that was most recently performed, or based on other information. In step 210, controller 352 disposed at robot 350 transmits an indication of the position to controller 372 disposed at end effector 370. The indication may comprise a timestamped 3D coordinate and rotational data, or other information.

After receiving the indication, in step 212 the controller 372 determines a position of the end effector 370. This may be performed by operating sensors at end effector 370 in order to confirm that end effector 370 has been placed in the desired position.

Based on the position of end effector 370, in step 214 controller 372 operates the end effector 370. For example, controller 372 may sense a location of a tool at end effector 370 relative to part 360, move the tool relative to the rest of end effector 370 based on the sensed location, perform an operation such as drilling at the part 360 using the tool, retract the tool, and inspect the part 360 after the operation has been completed. In further embodiments, controller 372 communicates with a separate inspection end effector on the same robot, or another robot with an inspection end effector brought in to inspect the work performed. Drilling and other operations may be performed using feedback control based on input from one or more sensors at end effector 370. In one embodiment, controller 372 performs drilling operations in response to determining that robot 350 has reached predefined locations for performing drilling as indicated in memory. In some embodiments, the controller 372 stores a library of commands for the end effector. Controller 372 may therefore select commands from the library to provide to the end effector 370, based on the position of the robot. In embodiments with multiple end effectors, each of the end effectors may perform different operations, and the dedicated controllers of the end effectors may each include different libraries of commands for operating their respective end effectors.

Upon completing the operation(s) for the current position, the controller 372 may transmit a confirmation to controller 352 that the operations have completed. End effector 370 may then halt operation at end effector 370, and direct the controller 352 to drive or otherwise move robot 350 to a location 364B. Controller 352 then moves robot 350 to the location 364B by operating drive units and/or a kinematic chain at robot 350. Controller 372 receives an indication of from the controller 352 that a new position has been reached, and performs an additional operation at the location 364B. After repositioning has been completed for robot 350, controller 352 may hold the robot 350 in position until the controller 352 receives a confirmation from the controller 372 indicating that an operation has completed. This coordinates the actions of end effector 370 and robot 350 with respect to each other. Before, during, or after robot 350 performs operations on the location 364B, another robot 350 may perform additional operations on location 364A. For example, one robot may utilize an end effector having a drill for performing drilling operations, another robot may utilize an end effector having a camera for inspecting drilled holes, another robot may utilize an end effector for inserting a pin into a hole, and yet another robot may include an end effector to finish installation of inserted pins into holes. These robots may operate in a coordinated serial fashion such that the inspection robot follows the drilling robot on the factory floor from location 364A, to location 364B, to location 364C, and so on in order to drill holes and inspect them as desired at the above-recited locations at part 360. In further embodiments, a multifunction end effector performs multiple functions at a location. These functions may include drilling a hole, inspecting the hole, installing a pin in the hole, and finishing fastener installation as needed prior to moving to the next work site.

Figure 4:
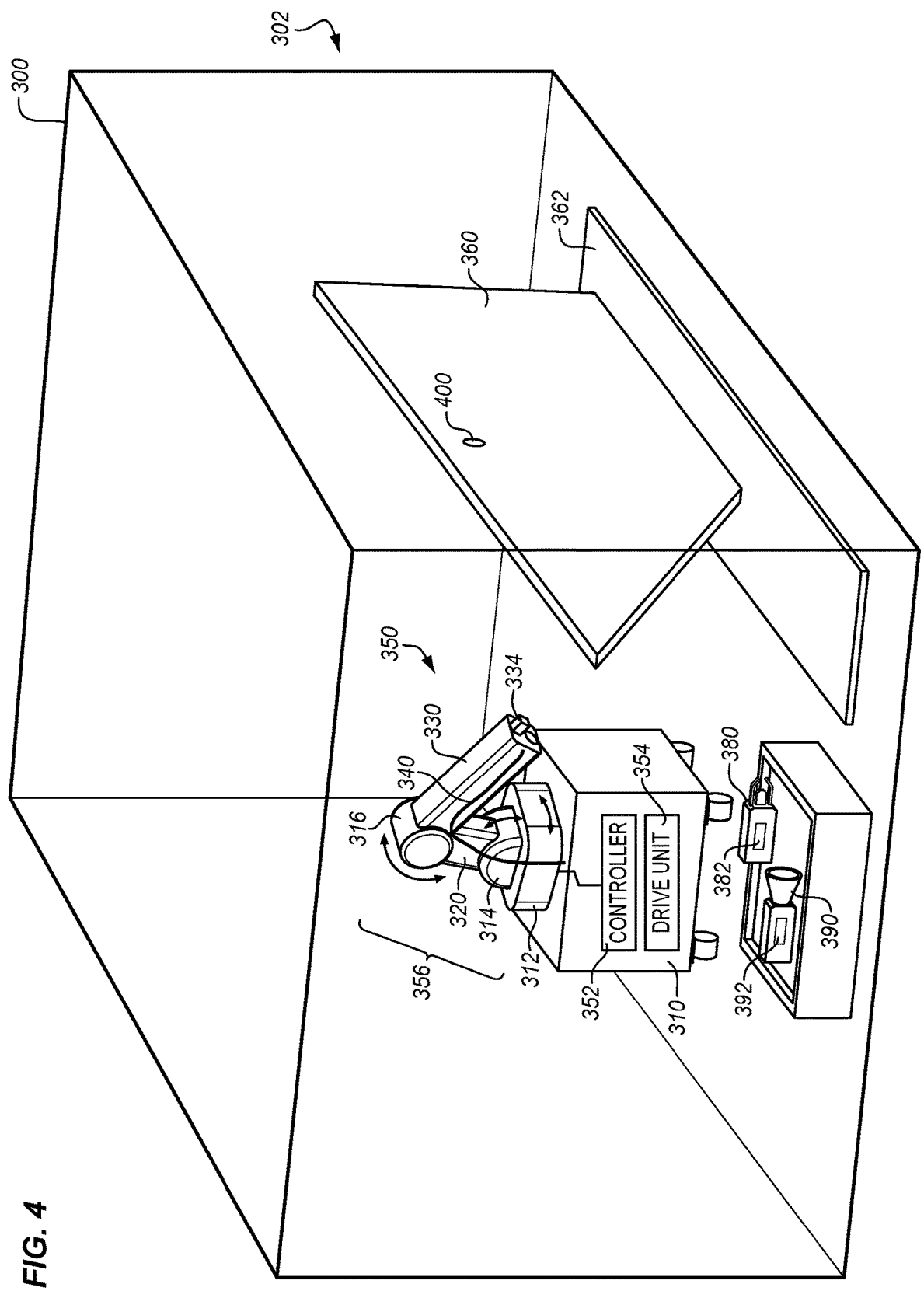
FIG. 4 illustrates removal of an end effector from a robot in an illustrative embodiment.
Figure 5:
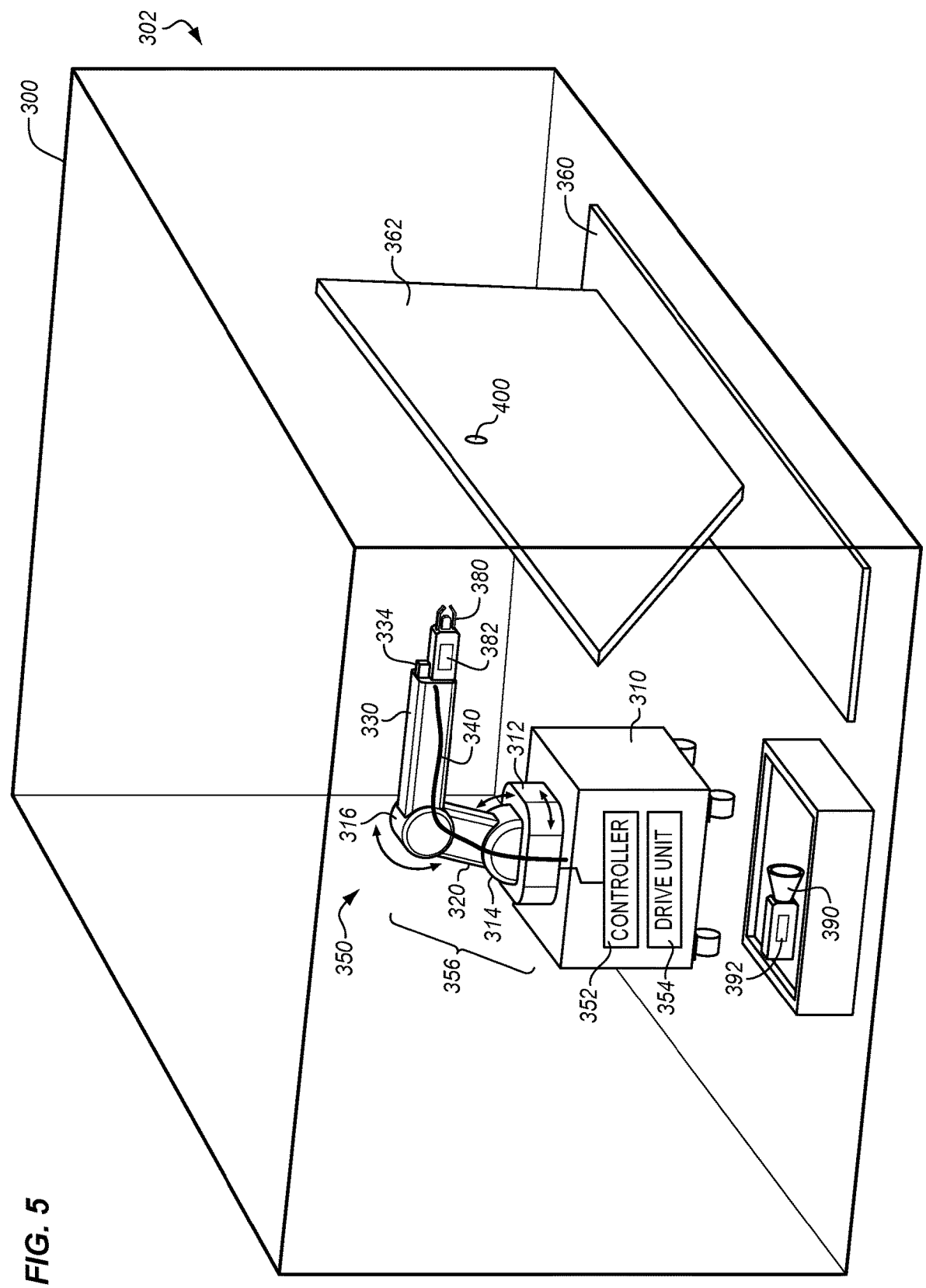
FIG. 5 illustrates a robot performing work on a part via a further end effector in an illustrative embodiment.

In further embodiments, operations may continue for a robot 350 until the end effector 370 is ready for maintenance, or in some embodiments until the end effector 370 has completed operations that the end effector 370 is being used for. In one embodiment, end effector 370 is removed from robot 350, as shown in FIG. 4, and a new end effector (e.g., another end effector 370) is mounted to robot 350 for performing additional work. In one embodiment, if end effector 370 was used to drill a hole 400 as shown in FIG. 4, an end effector 380 may be attached as shown in FIG. 5 in order to perform installation of a rivet into the hole 400.

Method 200 provides a benefit over prior systems and techniques because it decouples controllers used for robot control from the end effectors used by those robots. The end effectors, because they are separately and independently controlled, may be independently maintained, repaired, and diagnosed if needed. At the same time, the controller dedicated to controlling the robot does not need be updated, altered, or revised each time a new type of end effector is mounted to it. This provides technical benefits in the form of enhanced uptime for robots, and increased availability for end effector maintenance.

Figure 6:
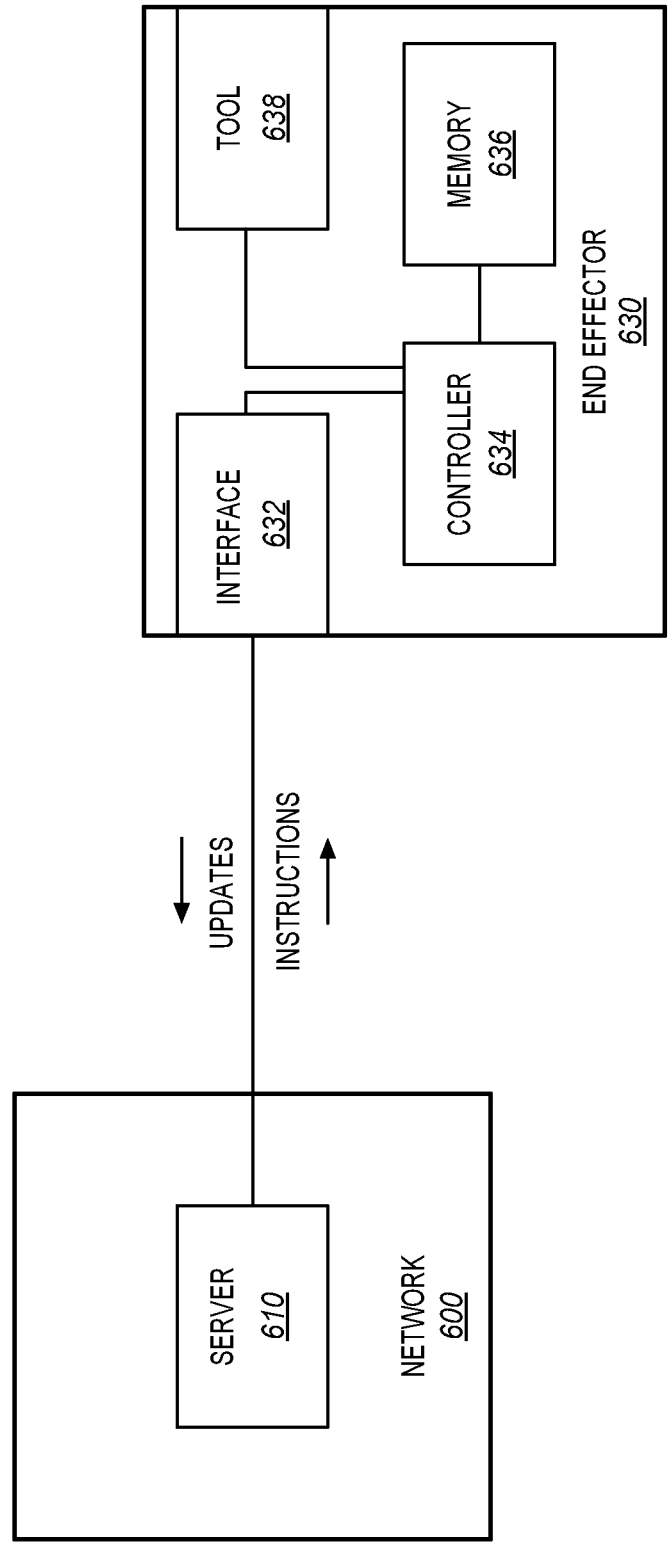
FIG. 6 is a block diagram illustrating an end effector being controlled via a network in an illustrative embodiment.

FIG. 6 is a block diagram illustrating an end effector 630 being controlled via a network 600 in an illustrative embodiment. The system of FIG. 6 may be utilized by removing an end effector from a robot, placing the end effector in storage, coupling the controller of the end effector for communication with a network, and performing a diagnostic on the end effector via the network while the end effector is removed from the robot. This means that end effector 630 may be removed from the robot and operated via its own dedicated controller while removed from the robot.

According to FIG. 6, interface 632 of end effector 630 is coupled for communication with server 610 of network 600 while in a maintenance mode. Server 610 may provide maintenance instructions which are interpretable by controller 634 of end effector 630. For example, server 610 may provide an updated NC program for storage in memory 636. In further embodiments, server 610 may provide debug commands or commands for controlling tool 638. Server 610 may even pose as a controller of a robot, sending updates to end effector 630 and testing the operations of end effector 630 and/or controller 634 in response to those position updates. For example, server 610 may determine whether controller 634 properly acts as a master controller that requests a slave controller of a robot to reposition the robot to desired locations. Managing the end effector 630 through a network therefore provides a powerful technical benefit in the form of enhanced maintenance and control of end effector 630.

In further embodiments (e.g., where multiple robots do not operate in a coordinated serial fashion), a robot may utilize multiple end effectors in sequence in order to perform work on one or more parts. These tasks may include removing a current end effector at the robot, installing an additional end effector at the robot, and transmitting an indication of a new position of the robot from the controller of the robot to a controller disposed at the additional end effector. The controller at the additional end effector determines additional operations to perform at the additional end effector based on the new position of the robot, and directs the additional end effector via its dedicated controller to perform the additional operations.

EXAMPLES

In the following examples, additional processes, systems, and methods are described in the context of a fabrication system wherein a robot utilizes an end effector that has its own independent controller.

Referring more particularly to the drawings, embodiments of the disclosure may be described in the context of aircraft manufacturing and service in method 700 as shown in FIG. 7 and an aircraft 702 as shown in FIG. 8. During pre-production, method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine work in maintenance and service 716 (which may also include modification, reconfiguration, refurbishment, and so on). Apparatus and methods embodied herein may be employed during any one or more suitable stages of the production and service described in method 700 (e.g., specification and design 704, material procurement 706, component and subassembly manufacturing 708, system integration 710, certification and delivery 712, service 714, maintenance and service 716) and/or any suitable component of aircraft 702 (e.g., airframe 718, systems 720, interior 722, propulsion system 724, electrical system 726, hydraulic system 728, environmental 730).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 702 produced by method 700 may include an airframe 718 with a plurality of systems 720 and an interior 722. Examples of systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 700. For example, components or subassemblies corresponding to component and subassembly manufacturing 708 may be fabricated or manufactured in a manner similar to components or subassemblies produced while the aircraft 702 is in service. Also, one or more apparatus embodiments, method embodiments, or a combination thereof may be utilized during the subassembly manufacturing 708 and system integration 710, for example, by substantially expediting assembly of or reducing the cost of an aircraft 702. Similarly, one or more of apparatus embodiments, method embodiments, or a combination thereof may be utilized while the aircraft 702 is in service, for example and without limitation during the maintenance and service 716. For example, the techniques and systems described herein may be used for material procurement 706, component and subassembly manufacturing 708, system integration 710, service 714, and/or maintenance and service 716, and/or may be used for airframe 718 and/or interior 722. These techniques and systems may even be utilized for systems 720, including, for example, propulsion system 724, electrical system 726, hydraulic 728, and/or environmental system 730.

In one embodiment, a part comprises a portion of airframe 718, and is manufactured during component and subassembly manufacturing 708. The part may then be assembled into an aircraft in system integration 710, and then be utilized in service 714 until wear renders the part unusable. Then, in maintenance and service 716, the part may be discarded and replaced with a newly manufactured part. Inventive components and methods may be utilized throughout component and subassembly manufacturing 708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for controlling a robot, the method comprising:
   maneuvering a robot via a robot controller that is dedicated to operating the robot, thereby altering a position of an end effector mounted to the robot;
   communicating from the robot controller to an end effector controller that is disposed at the end effector and is dedicated to operating the end effector, wherein the communicating indicates a position of the robot with a 3D coordinate and rotational data;
   determining a position of the end effector via the end effector controller based on the position of the robot; and
   operating the end effector via the end effector controller based on the position of the end effector.

2. The method of claim 1 further comprising:
   determining a position of the robot via the robot controller.

3. The method of claim 1 further comprising:
   selecting the end effector from a group of end effectors that each include an end effector controller; and
   mounting the end effector to the robot.

4. The method of claim 1 wherein:
   the end effector controller stores a library of commands for the end effector, and the method further comprises:
   selecting commands from the library to operate the end effector via the end effector controller, based on the position of the robot.

5. The method of claim 4 wherein:
   the end effector is from a group of end effectors that each have a dedicated controller; and
   each of the end effectors performs different operations, and the controllers of the end effectors each include different libraries of commands for operating their respective end effectors.

6. The method of claim 1 further comprising:
   performing feedback-based control of a position of the end effector via the end effector controller, based on input from a sensor at the end effector.

7. The method of claim 1 wherein operating the end effector is employed during a stage of production of a portion of an aircraft.

8. A non-transitory computer readable medium embodying programmed instructions which, when executed by a processor, are operable for performing a method for controlling an end effector of a robot, the method comprising:
   maneuvering a robot via a robot controller that is dedicated to operating the robot, thereby altering a position of an end effector mounted to the robot;
   communicating from the robot controller to an end effector controller that is disposed at the end effector and is dedicated to operating the end effector, wherein the communicating indicates a position of the robot with a 3D coordinate and rotational data;
   determining a position of the end effector via the end effector controller based on the position of the robot; and
   operating the end effector via the end effector controller based on the position of the end effector.

9. The non-transitory computer readable medium of claim 8 further comprising:
   determining a position of the robot via the robot controller.

10. The non-transitory computer readable medium of claim 8 wherein the method further comprises:
    selecting the end effector from a group of end effectors that each include an end effector controller; and
    mounting the end effector to the robot.

11. The non-transitory computer readable medium of claim 8 wherein:
    the end effector controller stores a library of commands for the end effector, and the method further comprises:
    selecting commands from the library to operate the end effector via the end effector controller, based on the position of the robot.

12. The non-transitory computer readable medium of claim 8 wherein:
    the end effector is from a group of end effectors that each have a dedicated controller; and
    each of the end effectors performs different operations, and the controllers of the end effectors each include different libraries of commands for operating their respective end effectors.

13. The non-transitory computer readable medium of claim 8 wherein the method further comprises:
    performing feedback-based control of a position of the end effector via the end effector controller, based on input from a sensor at the end effector.

14. The non-transitory computer readable medium of claim 8 wherein operating the end effector is employed during a stage of production of a portion of an aircraft.

15. A system for controlling work via a robot, the system comprising:
- a robot comprising a robot controller that is dedicated to operating the robot; and
- an end effector configured for attachment to the robot, the end effector comprising:
    - an interface that is configured to receive information from the robot indicating locations of the robot from the robot controller each location indicated with a 3D coordinate and rotational data;
    - a tool that is configured to perform work on a part; and
    - an end effector controller that is dedicated to operating the end effector, and is configured to direct operations of the tool based on the locations of the robot.

16. The system of claim 15 wherein:
the robot controller is subordinated to the end effector controller such that the robot controller performs actions at the direction of the end effector controller.

17. The system of claim 15 wherein the end effector is configured to be employed during a stage of production of a portion of an aircraft.

18. An apparatus for controlling work via a robot, the apparatus comprising:
- a robot comprising a drive unit which translates the robot to adjust a position of the robot;
- a robot controller that is dedicated to operating the robot and is communicatively coupled with the robot;
- an end effector coupled to the robot, the end effector comprising a tool that is configured to perform work on a part; and
- an end effector controller that is dedicated to operating the end effector, is communicatively coupled with the end effector, and is configured to direct operations of the tool based on communications with the robot controller that indicate a position of the robot with a 3D coordinate and rotational data, wherein the end effector controller determines a position of the end effector based on the position of the robot.

19. The apparatus of claim 18 wherein:
the robot controller is subordinated to the end effector controller such that the robot controller performs actions at the direction of the end effector controller.

20. The apparatus of claim 18 wherein the end effector is configured to be employed during a stage of production of a portion of an aircraft.

* * * * *